United States Patent [19]

Shackleton

[11] Patent Number: 4,693,147
[45] Date of Patent: Sep. 15, 1987

[54] DRIVE MECHANISMS FOR ROTATING CRANKSHAFTS FOR USE IN MACHINE TOOLS

[75] Inventor: Raymond T. Shackleton, Keighley, United Kingdom

[73] Assignee: Butler Newall Machine Tool Company Limited, West Yorkshire, United Kingdom

[21] Appl. No.: 810,599

[22] Filed: Dec. 19, 1985

[30] Foreign Application Priority Data

Mar. 22, 1985 [GB] United Kingdom ............... 8507580

[51] Int. Cl.⁴ ..................... B23B 31/00; B23B 5/22
[52] U.S. Cl. ........................... 82/40 A; 82/8; 82/40 R; 279/106
[58] Field of Search ............ 82/8, 9, 40 R, 40 A; 409/199, 200, 219; 279/106; 29/6

[56] References Cited

U.S. PATENT DOCUMENTS

| | | | |
|---|---|---|---|
| 312,615 | 2/1885 | Cullen et al. | 82/8 |
| 964,316 | 7/1910 | Hess | 82/40 A |
| 1,948,866 | 2/1934 | Norton et al. | 82/8 |
| 2,396,841 | 3/1946 | Flygare | 82/40 R |
| 2,620,699 | 12/1952 | Meyer | 82/40 A |

FOREIGN PATENT DOCUMENTS

| | | |
|---|---|---|
| 1435674 | 5/1976 | United Kingdom . |
| 1559550 | 1/1980 | United Kingdom . |
| 1566689 | 5/1980 | United Kingdom . |
| 2130135 | 5/1984 | United Kingdom . |

*Primary Examiner*—Nicholas P. Godici
*Assistant Examiner*—Jerry Kearns
*Attorney, Agent, or Firm*—Watson, Cole, Grindle & Watson

[57] ABSTRACT

A drive mechanism for rotating a crankshaft in a machine tool for working on the crankshaft includes a disc rotatable about a horizontal axis coincident with the crankshaft axis, the disc having a radial slot to receive a throw of the crankshaft. An endless flexible drive belt extends around a greater part of the periphery of the disc except for an upper part of the disc periphery and around a drive device to rotate the disc and with it the crankshaft throw in the radial slot in the disc. The crankshaft can be inserted in and removed from the disc when the disc is orientated with the slot vertical and when rotated away from the vertical, the crankshaft throw is retained in the slot by reason of the endless drive belt extending over the slot.

8 Claims, 5 Drawing Figures

DRIVE MECHANISMS FOR ROTATING CRANKSHAFTS FOR USE IN MACHINE TOOLS

BACKGROUND OF THE INVENTION

1. Field of the invention

This invention relates to drive mechanisms for rotating crankshafts for use in machine tools for working on crankshafts.

2. Description of the prior art

Machine tools for machining crankshafts by convention have head and tail stocks carrying chucks in which the ends of the crankshafts or other work pieces are supported for the machining operations.

UK Patent Specification No. 1435674 shows a difficult conventional arrangement. UK Patent Specification No. 1566689 discloses a machine tool for crankshaft machining in which a crankshaft is supported between head stocks for simultaneously milling two crank ends of the crankshaft. UK Patent Specification No. 1559550 discloses a crankshaft journal manufacturing machine tool having a bed with two space bearings supporting axially aligned chucks in which the ends of a crankshaft are engaged. Two milling units have a cross-slide carrying a tool drum provided with a rotary annual milling tool at its end face. The tool has inward directly cutting edges. An additional work piece support is associated with each milling unit to move with the unit to support the crankshaft at the location where the milling operation is carried out.

UK Patent Application No. 2130135 discloses a back rest for use in a milling machine for milling long work pieces such as crankshafts and comprises a supporting jaw which is adapted to be disposed under the work piece under the centre of the length of the work piece. The support can also provide for work piece rotation.

An object of the present invention is to provide a driving arrangement for rotating a crankshaft about a required axis so that machining or other operations can be performed on the ends of the crankshaft.

SUMMARY OF THE INVENTION

The invention provides a drive mechanism for rotating a crankshaft for use in a machine tool for working on the crankshaft which is comprising a disc, supported for rotation about a horizontal axis to coincide with the horizontal axis of the crankshaft, the disc including a radial slot extending inwardly from its outer periphery to receive a throw of the crankshaft, the periphrey of the disc having means for inter-engaging an endless drive, and an endless flexible drive which engages around at least that part of the periphery of the disc below the axis of the disc to rotate the disc and at the same time to hold the crankshaft throw in the radial slot in the disc but providing a gap around part of the disc periphery for loading and unloading a crankshaft throw.

Preferably the endless drive extends around a greater part of the periphery of the disc, leaving a gap over an upper peripheral part of the disc for loading and unloading of the crankshaft throw.

The disc may have an openable bridging member for closing the radial slot at the periphery thereof, the bridging member having an accurate outer surface forming a continuation of the periphery of the disc and being provided with means for inter-engaging the endless drive and an inner surface to engage a crankshaft throw in the slots i.e., to hold the throw positively in position in the slot. More specifically, the bridging member may be pivotally hinged to the disc on one side of the slot to permit opening of the slot for insertion or removal of a crankshaft throw.

In any of the above arrangements a plurality of rollers are provided which are rotatable about fixed axis spaced around the disc, the rollers engaging the endless drive on the opposite side thereof to that in engagement with the disc to support the disc, one of the rollers having drive means for moving the endless drive and with it the disc.

More specifically, there may be at least four rollers spaced around the disc, arranged as an upper pair and a lower pair, the endless drive extending around the disc periphery from one upper roller around the inner sides of the rollers to the other upper roller and then around the outer sides of the rollers clear of the disc so that the two upper rollers define between them the gap in the endless drive around the disc periphery.

Preferably the drive rollers have spaced apart side cheeks and the peripheries of the disc engages the endless drive between the cheeks, which constrain the disc axially.

The endless drive may be a belt having inner and outer teeth. In this event the driving disc and drive rollers will have corresponding teeth.

Alternatively the endless drive may be a roller chain. In this event the disc and rollers will have sprockets for co-operating with the chain.

The invention will be better understood by reference to the accompanying drawings taken in conjunction with the following discussion.

DESCRIPTION OF THE PREFERRED EMBODIMENTS

Figure 1:
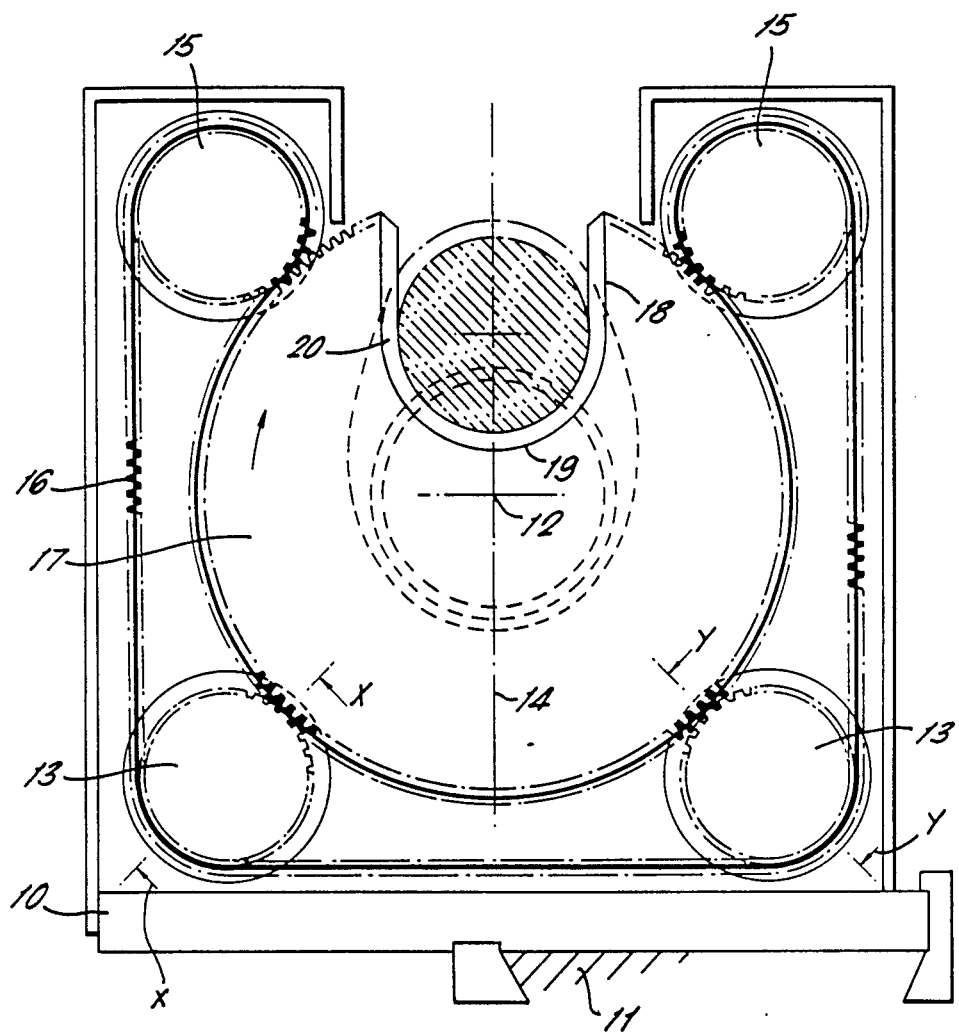
FIG. 1 is a diagrammatic view of a first embodiment of a drive mechanism according to the invention for turning a crankshaft in a machine tool.
Figure 2:
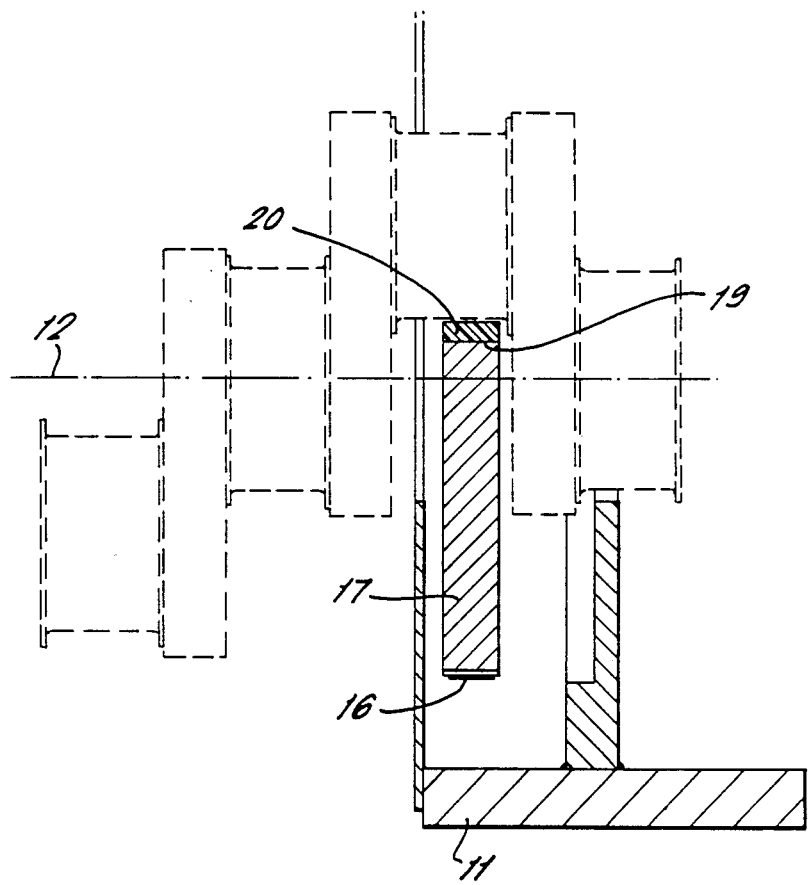
FIG. 2 is a partly sectioned side view of the drive mechanism.
Figure 3:
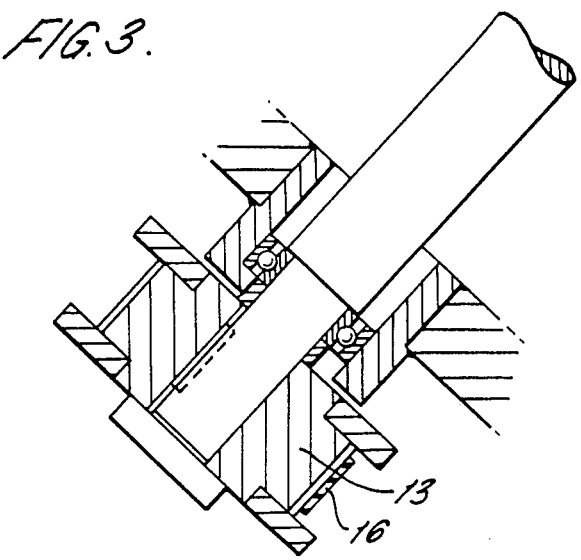
FIG. 3 is a sectional view of FIG. 1 as seen along the line Y—Y.
Figure 4:
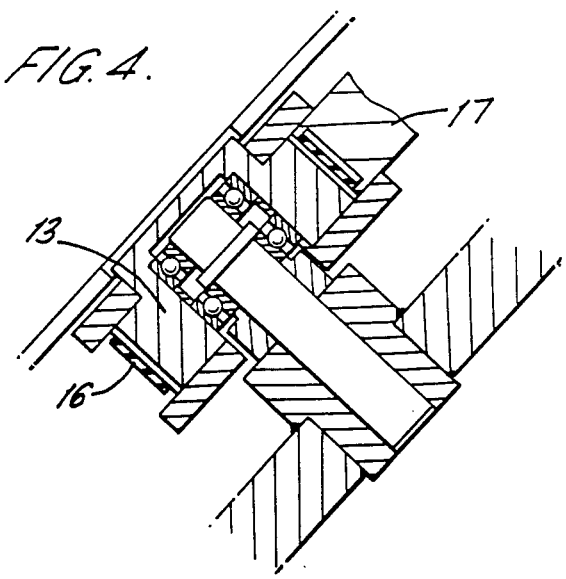
FIG. 4 is a sectional view of FIG. 1 as seen along the line X—X.

The drawings illustrate a drive mechanism for rotating a crankshaft supported in a machine tool such as a grinding machine in which the crankshaft is supported between centres or in steadies, depending on the operation required to be performed on the crankshaft. The machine tool and details of the support mechanism for the crankshaft are omitted from the illustration in the drawings.

The drive mechanism of the invention for driving the crankshaft utilising one of the throws of the crankshaft comprises a base 10 supported on a dovetail section slideway 11. The axis about which the crankshaft is supported for rotation in the machine tool is indicated at 12. Two lower pulleys 13 are mounted below the axis and equally spaced to either side of a vertical line 14 extending through the axis and, similarly, two upper pulleys 15 are mounted above the horizontal axis 12 and are equi-spaced on either side of the vertical line 14.

Each of the pulleys 13, 15 has an externally toothed periphery between side cheeks of the pulley and an endless double-sided toothed timing belt 16 extends around the pulleys. An externally toothed disc 17 is located between the pulleys, with the periphery of the disc passing between the pulley flanges and engaging the belt where it rides around the pulleys so that the disc is supported for rotation with its axis co-incident with the aforesaid axis 12. The belt passes around a greater part of the periphery of the disc except for that part between the upper pulleys 15 which is left unobstructed. After passing around the periphery of the disc, the belt extends around the outer periphery of pulley 15 and, then downwardly, around the outer periphery of the lower pulley 13 below, the horizontally beneath the disc and around the outer periphery of the other lower roller, and then up to the outer periphery of the other upper pulley, and thence back into engagement with the disc. The belt is held in tension by the pulleys/disc arrangement to ensure positive drive engagement and no slippage.

The disc is formed with a radial slot 18 extending inwardly from its periphery at one location, the slot having a smoothly curved bottom 19 and lined with a plastic liner 20. The slot receives the eccentric throw of a crankshaft loaded in the machine so that rotation of the disc turns the throw with respect to the crankshaft axis 12 for carrying out the machine operation on the crankshaft. In the example shown, the lower right-hand pulley 13 is driven by an electric drive motor, although any of the other pulleys could equally be used for driving the endless belt and therefore the disc.

As the open slot revolves past each idler pulley in turn, the timing belt will bridge the gap but may tend to ride away from the teeth in that idler. This is of no consequence since the pulley is positively driven by the belt and therefore the teeth of the belt cannot slip out of sequence. Any tendency for the disc to move eccentrically as the slot passes past a pulley is restricted by the inner surface of the radial slot contacting the crank pin therein. The disc is restrained endwise by flanges on the four idler pulleys and because of the relatively low velocities of the faces in contact with the disc, there is no undue friction at these points. Since the radial slot is closed at all times when the slot points below the horizontal, the crank pin is at all times maintained in the slot.

The arrangement enables a crankshaft to be supported by a chosen arrangement for a machine tool operation such as a grinding operation and turned in the supports whilst both ends of the crankshaft are left exposed allowing two grinding wheels or other machine tools to act on the disc simultaneously.

The disc 17 in effect, "floats" within the encircling belt, supported by the idler pulleys. At the point where the slot in the disc passes each idler pulley, it will tend to pick up the slack in the belt at that point, so causing the disc to follow an eccentric path. This is of no great detriment at speeds normally used the disc can be made of aluminium alloy. By lining the slot with nylon or other similar plastic material and restricting the clearance between the crank pin and the inner end of the radial slot, this eccentricity is kept to a minimum.

The double sided tooth belt is used because it eliminates the need to completely exclude coolant but of course, a roller chain would otherwise serve the purpose.

Figure 5:
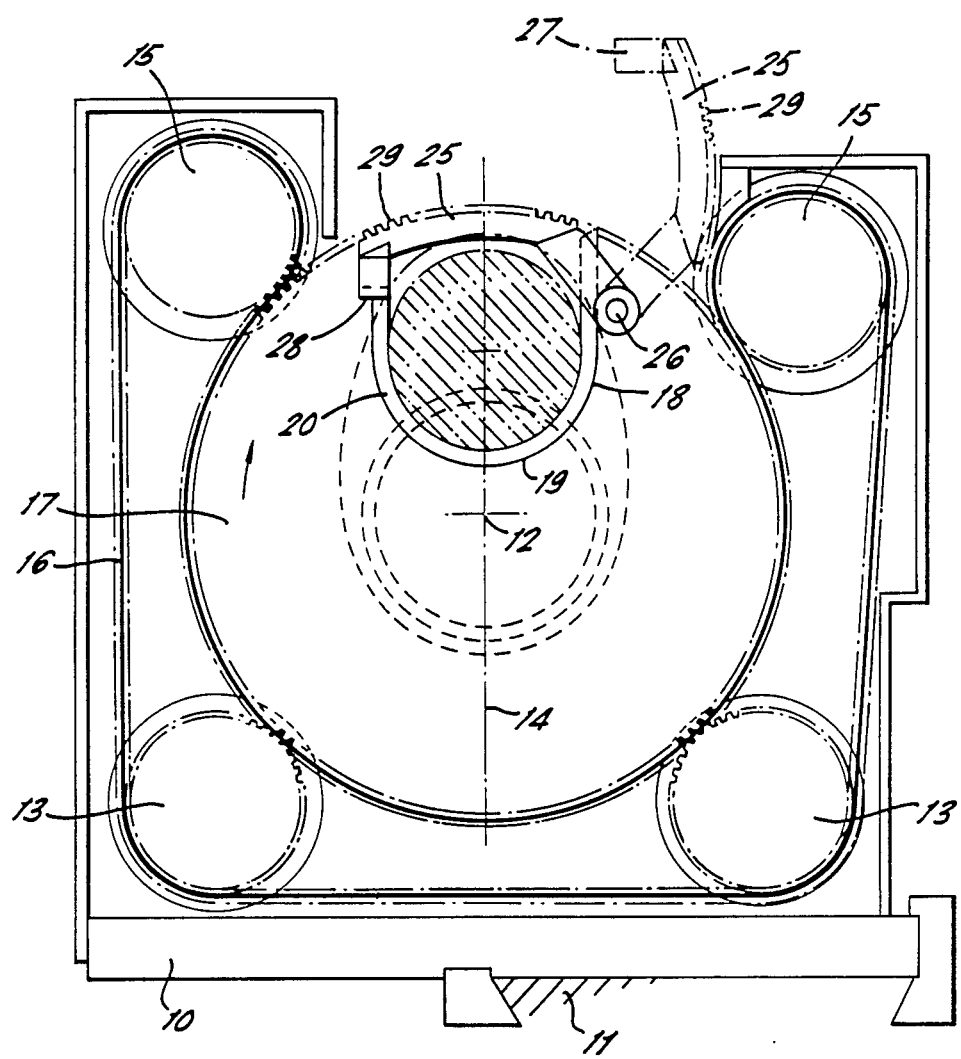
FIG. 5 is a similar view to FIG. 1 showing a modified arrangement.

FIG. 5 shows an alternate embodiment to the one described above. For the sake of simplicity like parts have been alotted the same reference numerals. In cases where the driving forces are high, there is a risk of bending the component by permitting the curved surface of the disc slot 19 to move into contact with the crank pin as the driving slot passes each pulley 13 or 15. To avoid this difficulty an accurate bridge member 25 is mounted on the disc to extend across the open end of the slot. The disc has a pivotal mounting 26 to one side of the slot on which one end of the member is mounted, the other end of the member having a tongue 27 to engage in a recess 28 in the disc. The outer accurate surface of the member 25 has teeth 29 similar to those on the disc periphery for engagement with the toothed endless belt and the inner side of the bridge member is curved to bear on the crank throw or pin. Thus the disc is provided with a continuous periphery of driving teeth presented to the belt and therefore providing continuous support against the driving disc being moved off-centre as the slot in the disc passes each pulley. For loading and unloading a crankshaft, the bridge member is simply swung about its pivotal mounting into an upright position thereby opening the slot in the disc.

I claim:

1. A drive mechanism for rotating a crankshaft so that the crankshaft, when oriented such that its axis of rotation is horizontally oriented, can be operated on by a machine tool, said crankshaft including a throw, the drive mechanism comprising:
   - a disc for rotation about a horizontal axis to coincide with the horizontal axis of said crankshaft;
   - a radial slot extending into the disc from an outer peripheral part thereof to receive said throw of said crankshaft to rotate the crankshaft with rotation of the disc;
   - a plurality of rollers;
   - means to mount the rollers in an arc extending around said horizontal axis of rotation of the disc but not directly above said axis;
   - an endless flexible drive extending around the arcuately spaced rollers with an inner stretch of the drive engaging the inner sides of the rollers with respect to said horizontal axis and an outer stretch of the drive engaging outer sides of the rollers with respect to said axis;
   - said disc having a peripheral part in driving engagement with said inner stretch of the endless drive, said stretch thereby being held in arcuate formation by the periphery of the disc;
   - drive means for at least one of the rollers for turning the roller and thereby displacing the flexible drive to turn the disc about said horizontal axis; and
   - guide means on the rollers for engaging the periphery of the disc to restrain the disc against axial movement with respect to said rollers.

2. A drive mechanism as claimed in claim 1, wherein said guide means on the rollers comprise radially outwardly extending side cheeks on the rollers and the periphery of the disc engages the rollers between the cheeks to restrain the disc axially with respect to the rollers.

3. A drive mechanism as claimed in claim 1, wherein the disc has an openable bridging member for closing the radial slot in the disc at the periphery of the disc, the bridging member having an accurate outer surface forming a continuation of the periphery of the disc and provided with engagement means for interlocking with said endless drive and an inner surface to engage a crankshaft throw in the slot to hold the throw positively in position in the slot.

4. A drive mechanism as claimed in claim 3 wherein the bridging member is pivotally hinged to the disc on one side of the slot to permit opening of the slot for insertion or removal of a crankshaft throw.

5. A drive mechanism as claimed in claim 1, wherein there are at least four rollers spaced around the disc and arranged as an upper pair and a lower pair, the endless drive extending around the disc periphery from one upper roller around the inner sides of the rollers to the other upper roller and then around the outer sides of the rollers clear of the disc so that the two upper rollers define between them the gap in the endless drive around the disc periphery.

6. A drive mechanism as claimed in claim 1, wherein said endless, flexible drive is a belt having inner and outer teeth and the driving disc and drive rollers have corresponding teeth.

7. A drive mechanism as claimed in claim 1, wherein said endless, flexible drive is a roller chain and the disc and rollers have sprockets for cooperating with the chain.

8. A drive mechanism for rotating a crankshaft so that the crankshaft, when oriented such that its axis of rotation is horizontally oriented, can be operated on by a machine tool, said crankshaft including a crank pin, said drive mechanism comprising:

a vertically-oriented disc which includes a radial slot extending inwardly towards a center thereof from a first portion of its periphery, the remaining portion of its periphery including engagement means that can interlock with an endless, flexible belt means, said disc having a predetermined thickness and a predetermined diameter and said radial slot being shaped such that said crank pin of said crankshaft can fit within said radial slot and, when so positioned within said radial slot, the center of said disc will essentially coincide with the axis of rotation of said crankshaft;

a plurality of rollers located in spaced apart fashion around the periphery of said disc, none of said rollers being located adjacent said first portion thereof when said slot extends vertically downwardly towards the center of said disc, each of said rollers including engagement means around their peripheries for interlocking with an endless, flexible belt means and each of said rollers including guide means for restraining horizontal movement of said disc;

an endless, flexible belt means extending around said rollers so as to form an outer stretch that does not contact with said disc and an inner stretch which contacts a second portion of the periphery of said disc, said second portion not including said first portion when said radial extends vertically downwardly towards the center of said disc, said endless, flexible belt means being capable of interlocking with said engagement means on the periphery of said disc and the engagement means of the peripheries of said rollers; and a drive means connected to one of said rollers to cause said one roller to rotate and said endless, flexible belt means to move along its length, thus causing said disc to rotate and thereby said crankshaft to rotate about its axis of rotation.

* * * * *